US012633203B2

(12) United States Patent (10) Patent No.: US 12,633,203 B2
Orsot-Weatherman (45) Date of Patent: May 19, 2026

(54) SMART TRACKING SHOE

(71) Applicant: Shiela Orsot-Weatherman, Baton Rouge, LA (US)

(72) Inventor: Shiela Orsot-Weatherman, Baton Rouge, LA (US)

( * ) Notice: Subject to any disclaimer, the term of this patent is extended or adjusted under 35 U.S.C. 154(b) by 0 days.

(21) Appl. No.: 18/808,792

(22) Filed: Aug. 19, 2024

(65) Prior Publication Data

US 2026/0051234 A1 Feb. 19, 2026

(51) Int. Cl.
| | |
|---|---|
| *A43B 3/48* | (2022.01) |
| *A43B 3/38* | (2022.01) |
| *A43B 13/36* | (2006.01) |
| *G01S 19/01* | (2010.01) |
| *G08B 21/02* | (2006.01) |
| *H02J 7/35* | (2006.01) |

(52) U.S. Cl.
CPC ............ *G08B 21/0269* (2013.01); *A43B 3/38* (2022.01); *A43B 3/48* (2022.01); *G08B 21/023* (2013.01); *G08B 21/0277* (2013.01); *H02J 7/35* (2013.01); *H02J 2300/22* (2020.01)

(58) Field of Classification Search
None
See application file for complete search history.

(56) References Cited

U.S. PATENT DOCUMENTS

| | | | |
|---|---|---|---|
| 5,410,821 A * | 5/1995 | Hilgendorf | ......... A43B 1/0081 36/73 |
| 7,714,709 B1 | 5/2010 | Daniel | |
| 9,392,844 B1 | 7/2016 | Burrell | |
| 10,176,691 B2 | 1/2019 | Smoak | |
| 10,420,388 B2 | 9/2019 | Lin | |
| 11,607,004 B2 | 3/2023 | Jones | |
| 11,737,507 B1 | 8/2023 | Chowdhury et al. | |
| 2007/0044346 A1 | 3/2007 | Ungari et al. | |
| 2009/0031588 A1 | 2/2009 | Reuben | |
| 2010/0090477 A1 | 4/2010 | Keating et al. | |
| 2013/0088386 A1 | 4/2013 | Goswami | |
| 2016/0106177 A1 | 4/2016 | De Laurentis | |
| 2016/0338444 A1 * | 11/2016 | Ochipa | ................... A43B 7/10 |
| 2020/0268100 A1 * | 8/2020 | Bramani | ............... A43B 13/36 |
| 2021/0236880 A1 | 8/2021 | Kovach et al. | |
| 2022/0022590 A1 | 1/2022 | Sanders | |
| 2022/0071342 A1 | 3/2022 | Jinete | |
| 2022/0287410 A1 | 9/2022 | Bertagna et al. | |
| 2023/0034167 A1 * | 2/2023 | Barhudarian | ...... G01C 21/3652 |

* cited by examiner

*Primary Examiner* — John F Mortell
(74) *Attorney, Agent, or Firm* — Greg Mier

(57) ABSTRACT

Smart tracking footwear for tracking and locating children and/or the elderly. The footwear has one or more solar charging strips together with GPS tracking and built in Bluetooth and Wi-Fi capabilities. The footwear may also include a removable sole portion that comprises an identifiable tread pattern.

8 Claims, 2 Drawing Sheets

SMART TRACKING SHOE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

FIELD OF THE INVENTION

The subject invention relates generally to footwear. More particularly, the subject invention relates to footwear with built-in tracking capabilities.

BACKGROUND OF THE INVENTION

Children and the elderly can often go missing. The present invention is directed at tracking and finding such people when necessary. In a preferred embodiment, the present invention relates footwear and, more particularly, to a smart tracking shoe with self-charging and bult in tracking capabilities that is particularly suitable for use in tracking children and the elderly.

BRIEF DESCRIPTION OF THE ATTACHED DRAWINGS

The accompanying drawings are provided for the purpose of illustration only and are not intended as a definition of the limits of the present invention. The drawings illustrate a preferred embodiment of the present invention.

DESCRIPTION OF THE INVENTION

Figures 1, 2:
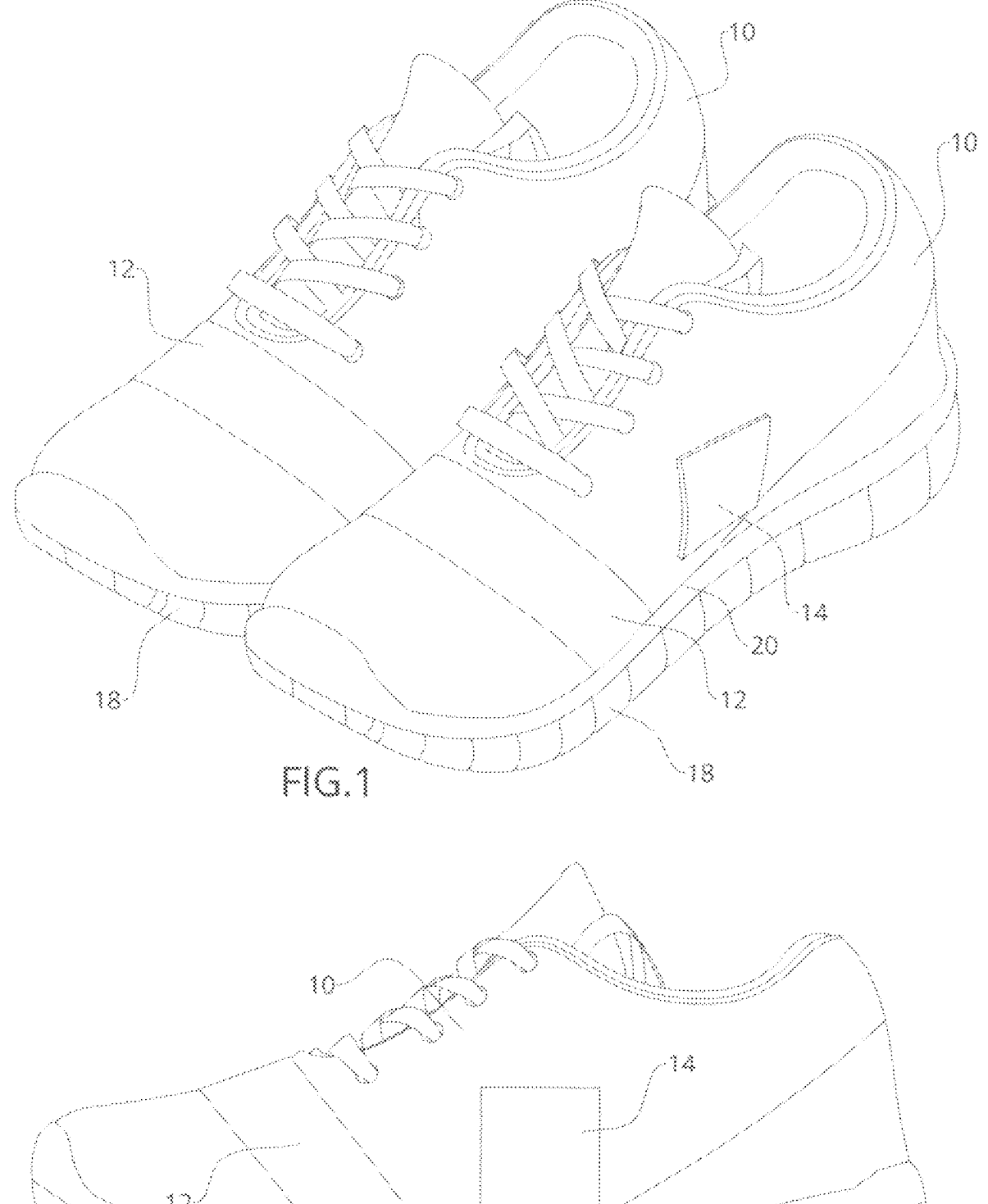
FIG. 1 is a perspective view of footwear in accordance with a preferred embodiment of the present invention.
FIG. 2 is a side view of the footwear shown on FIG. 1.

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Broadly, an embodiment of the present invention provides footwear that comprises solar charging capabilities together with GPS tracking and Bluetooth and Wi-Fi connectivity. As described herein, and as seen in FIGS. 1-4, in a preferred embodiment footwear 10 comprises an upper portion designed to accept the foot of a wearer, and a lower portion designed to make contact with the ground.

The upper portion included one or more solar strips 12 at an outer surface thereof to provide power to various components on the shoe. These components can include, by way of example, a GPS tracking device 14 and Bluetooth/Wi-Fi device 16 for tracking the location of footwear 10 via smart phone (not shown). The GPS tracking device can be located on the outer surface of the upper portion of the shoe 10 (see FIGS. 1 and 2) and/or on the lower sole portion 18 of the shoe 10 (see FIG. 3).

Figures 3, 4:
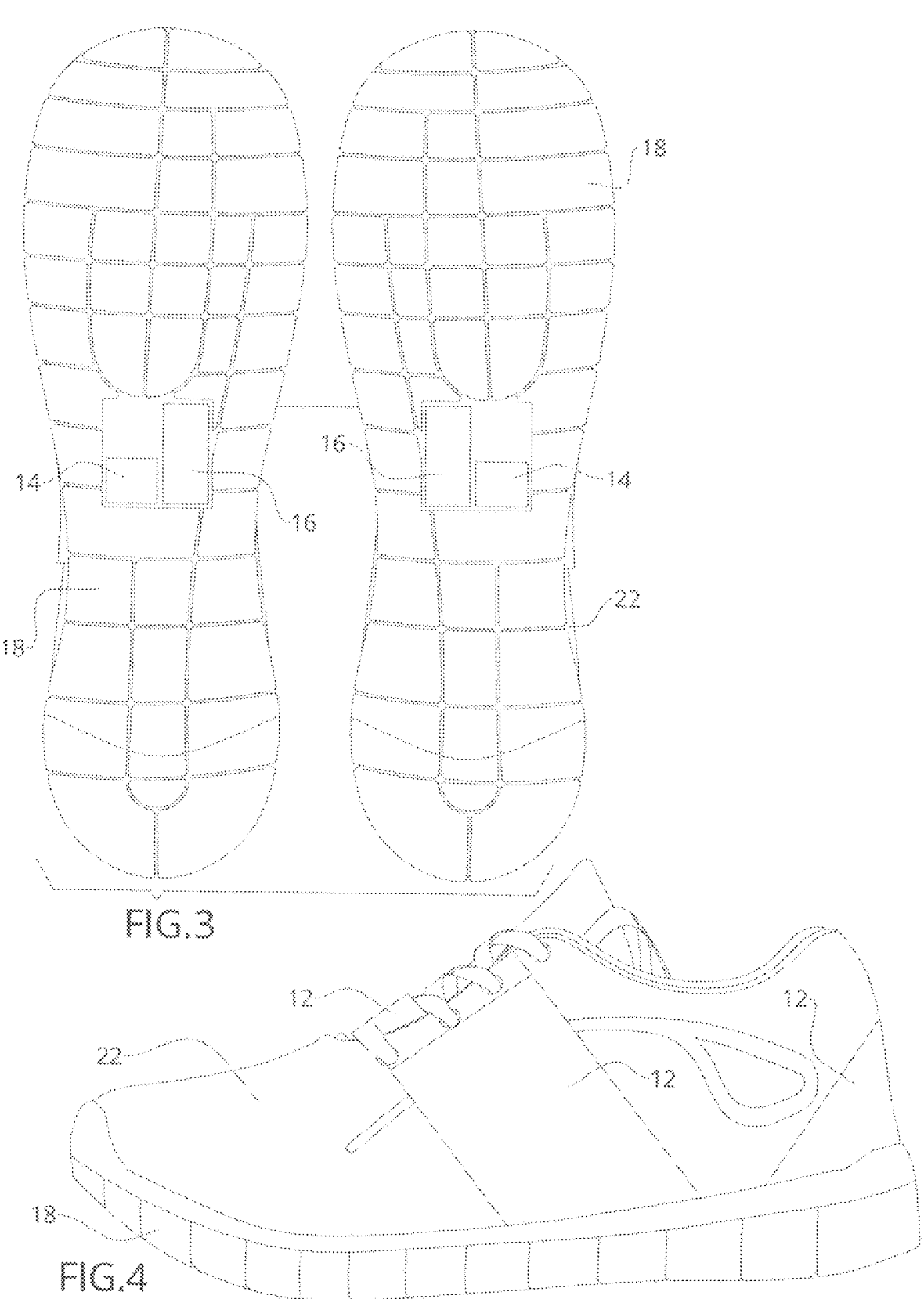
FIG. 3 is a bottom view of the footwear shown on FIG. 1.
FIG. 4 is a side view of footwear in accordance with an alternative embodiment of the present invention.

In a preferred embodiment, footwear 10 comprises drainage between the upper portion and a removeable sole 18. The purpose of the drainage is to help channel water away from the solar strips 12 and the components within the solar strips 12. In a preferred embodiment, removeable sole 18 comprises an identifiable tread design. An alternative footwear design is depicted in FIG. 4, wherein shoe 22 comprises solar strips 12 positioned both at the top surfaces and at a rear surface of the upper portion of the shoe.

As one of skill in the art would appreciate, footwear in accordance with the present invention will help track and locate children and the elderly. The person wears the footwear 10/22 and the shoe periodically pings its location via the built in a GPS tracking device 14 and Bluetooth/Wi-Fi device 16. In the event of a disappearance the location can be queried and tracking initiated. In addition, the identifiable tread design 18 on the sole of the shoe can also help in identifying the wearer of the shoe.

It is understood that one embodiment of the present invention has been disclosed by way of example and that other modifications and alterations may occur to those skilled in the art without departing from the scope and spirit of the present invention.

What is claimed is:

1. A smart tracking shoe comprising:
   (a) an upper portion for accepting the foot of a wearer, the upper portion comprising a first solar panel charging strip on an outer surface thereof;
   (b) a GPS tracking device powered by one or more solar strips;
   (c) a Bluetooth or Wi-Fi device for communicating with a smartphone; and
   (d) a lower removable sole portion, where said GPS tracking device is positioned on the lower removable sole portion of the shoe.

2. The smart tracking shoe of claim 1 further comprising a drainage component positioned between the upper portion of the shoe and the lower sole portion of the shoe.

3. The smart tracking shoe of claim 1 wherein the removeable sole portion comprises an identifiable tread design.

4. The smart tracking shoe of claim 1 wherein the first solar strip is positioned on an upper facing surface of the upper portion of the shoe.

5. The smart tracking shoe of claim 1 further comprising a second solar charging strip on an outer surface of the upper portion of the shoe.

6. The smart tracking shoe of claim 5 wherein the second solar strip is positioned on a rear facing surface of the upper portion of the shoe.

7. The smart tracking shoe of claim 1 wherein the GPS tracking device is positioned on a side facing surface of the upper portion of the shoe.

3

4

8. The smart tracking shoe of claim 1 wherein the Bluetooth or Wi-Fi device is positioned on the lower removable sole portion of the shoe.

\* \* \* \* \*